March 26, 1968  YOSHIO FUJII ET AL  3,375,080

APPARATUS FOR CHROMATOGRAPHIC ANALYSIS OF LIQUIDS

Filed April 7, 1964  2 Sheets-Sheet 1

INVENTORS
Yoshio Fujii
Kyoichi Ozawa

By: Paul M. Craig, Jr.
ATTORNEY

3,375,080
APPARATUS FOR CHROMATOGRAPHIC ANALYSIS OF LIQUIDS
Yoshio Fujii, Katsuta-shi, and Kyoichi Ozawa, Kyoto, Japan, assignors to Hitachi, Ltd., Tokyo, Japan, a corporation of Japan
Filed Apr. 7, 1964, Ser. No. 357,926
Claims priority, application Japan, Apr. 10, 1963, 38/17,661
2 Claims. (Cl. 23—253)

ABSTRACT OF THE DISCLOSURE

The present disclosure relates to an apparatus for the chromatographic analysis of liquids. More particularly, the present disclosure concerns the chromatographic analysis of liquids wherein means are provided so that the various components of a liquid sample separated in a chromatographic column will no remix before they are passed through a flow-through type photometer. Furthermore, the ratio of the amount of effluent supplied to the photometer to the amount of the effluent collected in a fraction collector, that is the fraction ratio can be freely varied and accurately established.

---

Figure 1:
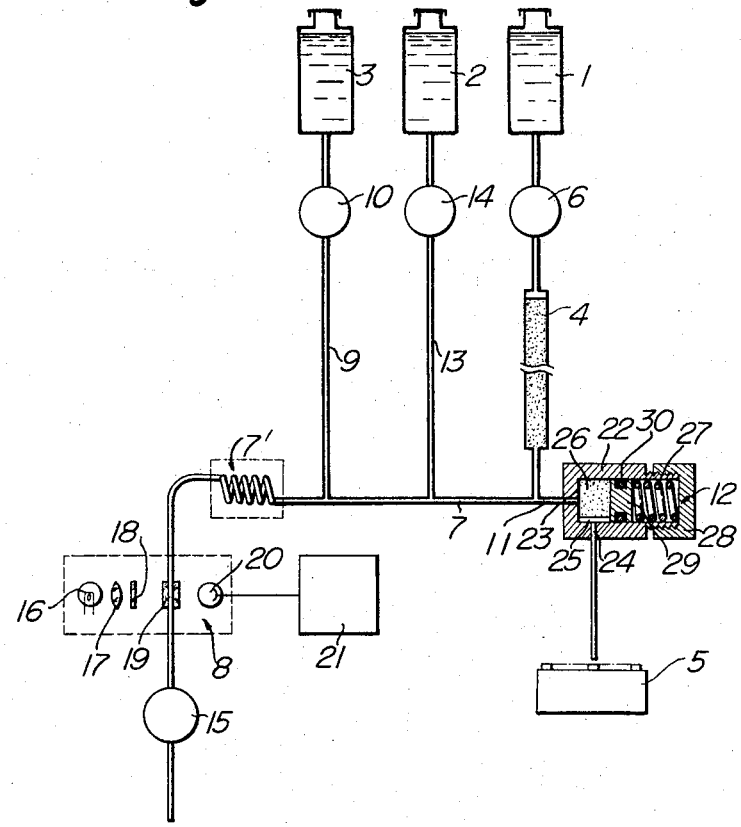

The present invention relates to improved apparatus for the chromatographic analysis of liquids.

In apparatus designed for the chromatographic analysis of liquids, it is a general practice to separate a sample by means of chromatography and to detect separated components by measuring their absorption coefficient for the qualitative and quantitative analysis of the sample. In the apparatus of the kind described above, it is generally necessary not only to supply a portion of an effluent delivered from the bottom of a column to a flow-through type photometer for the purpose of measuring the absorption coefficient of its components, but also to collect the remaining portion of the effluent in a fraction collector for the purpose of various other studies.

With the above peculiar manner of operation required for the apparatus of the type in view, it is the primary object of the invention to provide an improved apparatus adapted for the chromatographic analysis of liquids in which means are provided so that various components of a sample separated in a column and successively discharged from the bottom of the column may not remix before they pass through a flow-through type photometer, so that the ratio of an amount of the effluent to be supplied to the photometer to an amount of the effluent to be collected in a fraction collector, that is, the fraction ratio of the effluent flow may be freely variable, and so that such flow fraction ratio may be accurately established.

According to the invention, there is provided apparatus for chromatographic analysis of liquids having a column containing therein a sample, a supply pump connected to the upper end of said column for supplying an eluate therethrough, a main conduit connected to the lower end of said column for conducting an effluent therefrom a reaction vessel and a flow-through type photometer provided in said main conduit for receiving therein the effluent, and a supply pump for supplying a color-forming liquid by way of a color-forming liquid supply conduit to said main conduit at a position intermediate the lower end of said column and said reaction vessel; said apparatus comprising pressure means connected by way of an auxiliary conduit to said main conduit at a position intermediate the lower end of said column and the connection of said color-forming liquid supply conduit with said main conduit, a fraction collector provided downstream of said pressure means for communication therewith, flow restricting means provided in said main conduit at a position downstream of said flow-through type photometer, and a supply pump for supplying a fraction ratio determining liquid by way of a fraction ratio determining liquid by way of a fraction ratio determining liquid supply conduit to said main conduit at a position intermediate said reaction vessel and the connection of said main conduit with said auxiliary conduit, whereby the fraction ratio of the effluent can be set at any desired value by merely varying the amount of delivery of said supply pump supplying the fraction ratio determining liquid.

According to the invention, there is also provided apparatus for the chromatographic analysis of liquids having a column containing therein a sample, a supply pump connected to the upper end of said column for supplying an eluate therethrough, a main conduit connected to the lower end of said column for conducting an effluent therefrom, a reaction vessel and a flow-through type photometer provided in said main conduit for receiving therein the effluent, and a supply pump for supplying a color-forming liquid by way of a color-forming liquid supply conduit to said main conduit at a position intermediate the lower end of said column and said reaction vessel; said apparatus comprising pressure means connected by way of an auxiliary conduit to said main conduit at a position intermediate the lower end of said column and the connection of said color-forming liquid supply conduit with said main conduit, a fraction collector provided downstream of said pressure means for communication therewith, and flow restricting means provided in said main conduit at a position downstream of said flow-through type photometer, whereby the fraction ratio of the effluent can be set at any desired value by merely varying the amount of delivery of said supply pump supplying the color-forming liquid.

Figure 2:
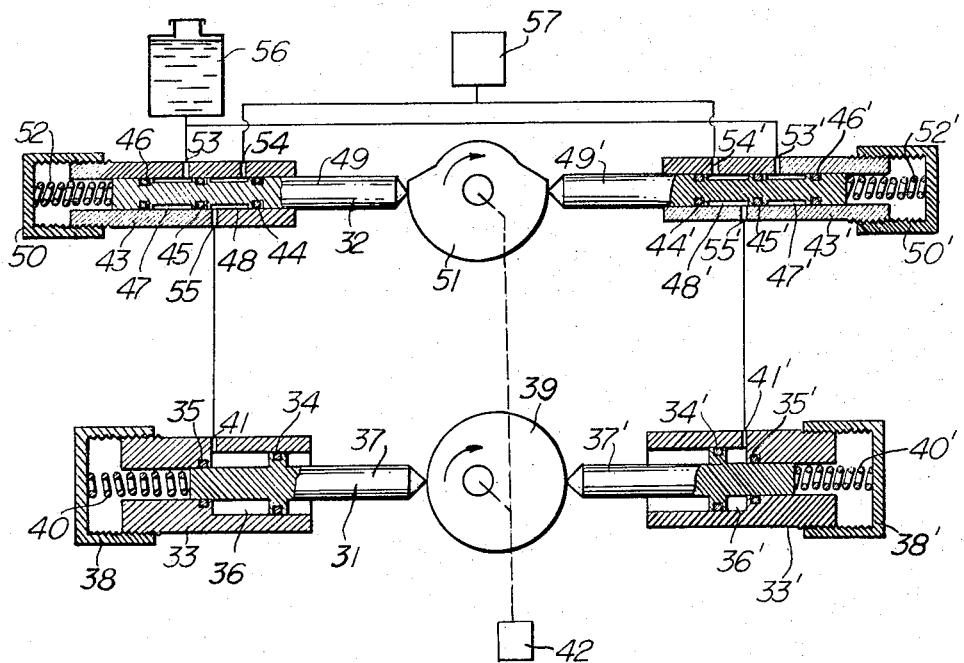

There are other objects and particularities of the invention which will become obvious from the following description with reference to the accompanying drawings, in which:

FIG. 1 is a diagrammatic front elevational view of an apparatus for the chromatographic analysis of liquids embodying the invention; and FIG. 2 is an enlarged longitudinal sectional view of a liquid supply pump used in the chromatographic liquid analysing apparatus of FIG. 1.

At first referring to FIG. 1, there is shown an inventive apparatus adapted for the chromatographic analysis of liquids, in which a vessel 1 for containing therein an eluate, a vessel 2 for containing therein a fraction ratio determining liquid and a vessel 3 for containing therein a color-forming liquid are seen as disposed at the upper portion of FIG. 1. A column 4 is disposed downstream of the vessel 1 and a liquid supply pump 6 of a structure as shown in FIG. 2 is connected between the vessel 1 and the upper end of the column 4. A fraction collector 5 is disposed downstream of the column 4 to receive therein a fraction of an effluent from the column 4, as will be described later.

A reaction vessel 7' and a flow-through type photometer 8 are successively connected to the lower end of the column 4 by way of a main conduit 7. A liquid supply pump 10 with a structure as shown in FIG. 2 is connected between the vessel 3 and a color-forming liquid supply conduit 9 which terminates in the main conduit 7 at a position intermediate the lower end of the column 4 and the reaction vessel 7'. An auxiliary conduit 11 is branched from the main conduit 7 at a position intermediate the lower end of the column 4 and the connection of the color-forming liquid supply conduit 9 with the main conduit 7, and terminates in a pressure means 12, which is made to communicate with the fraction collector 5. A liquid supply pump 14 with a structure as shown in FIG. 2 draws the fraction ratio determining liquid from the vessel 2 to supply it by way of a conduit 13 to the main conduit 7 at a position intermediate the reaction vessel 7' and the connection of the main conduit 7 with the auxiliary conduit 11. To the main conduit 7 at a position downstream of the flow-through type photometer 8, there is connected a flow restricting means 15 which may have a structure as shown in FIG. 2.

The flow-through type photometer 8 comprises a lamp 16 forming the light source, a condenser lens 17, a monochromatic light filter 18, a flow cell 19 and a detector 20. The detector 20 is connected to a recorder 21. The pressure means 12 comprises an outer casing 22 having an inlet 23 and an outlet 24, and a resilient member 26 is fitted within the casing 22 to form a flow passage 25 communicating with the outlet 24. Within the casing 22, a compression spring 27 is disposed between a pressure adjusting cap 28 and a movable member 29 so as to normally urge the resilient member 26 towards the inlet 23 to thereby shut off the passage 25. In order to suitably adjust the pressure applied to the resilient member 26, the cap 28 is in screw threaded engagement with the casing 22 so as to be advanced and retracted as desired on the casing 22. The movable member 29 is fitted within the casing 22 through a suitable packing 30 disposed on its outer periphery for movement in the casing 22 in liquid-tight relation.

Description will now be made with regard to the liquid supply pump illustrated in FIG. 2. The liquid supply pump comprises a reciprocating pump 31 and a flow passage change-over means 32. The reciprocating pump 31 has two cylinders 33 and 33' in which pistons 37 and 37' are slidably disposed to define therein two chambers 36 and 36', respectively. Packings 34, 34' and 35, 35' are provided on the respective pistons 37, 37' and in the respective cylinders 33 and 33' to provide necessary liquid-tightness. Compression springs 40 and 40' are interposed between the outer ends of the respective pistons 37 and 37' and respective end caps 38 and 38' so as to normally urge the inner ends of the pistons 37 and 37' towards each other for continual abutment with the outer periphery of a cam member 39. The end caps 38 and 38' are threaded for screw threaded engagement with the outer ends of the respective cylinders 33 and 33' to fasten the compression springs 40 and 40' in the operative positions. Common suction and discharge ports 41 and 41' are provided in the respective cylinders 33 and 33' so as to effect alternate suction of a liquid into and discharge from the respective chambers 36 and 36'. An electric motor 42 is drivingly connected with the cam member 39 which is eccentrically rotatably disposed so that, when the volume of any one of the chambers, for example, the chamber 36 changes from the maximum to the minimum, the volume of the other chamber or the chamber 36' ceases to change for a predetermined time as soon as the volume of the chamber 36 starts changing, and, after the subsequent change in the volume of the chamber 36 from the minimum to the maximum, ceases to change for a predetermined time until the volume of the chamber 36 changes again to the minimum.

The flow passage change-over means 32 comprises cylinders 43 and 43' in which pistons 49 and 49' are slidably fitted and have recesses on their outer peripheries to define suction passages 47, 47' and discharge passages 48 and 48', respectively. Packings 44, 45, 46 and 44', 45', 46' are fitted about the outer peripheries of the respective pistons 49 and 49' to insure liquid-tight movement thereof in the cylinders 43 and 43'. Compression springs 52 and 52' are interposed between the outer ends of the pistons 49 and 49' and end caps 50 and 50' of the cylinders 43 and 43', respectively, so as to normally urge the inner ends of the pistons 49 and 49' towards each other for continual abutment with the outer periphery of a cam member 51. The end caps 50 and 50' are threaded for screw threaded engagement with the outer ends of the respective cylinders 43 and 43' to fasten the compression springs 52 and 52' in the operative positions. In the cylinder 43, there are provided a suction port 53 and a discharge port 54 which communicate with the suction passage 47 and the discharge passage 48, respectively, at all operative positions of the piston 49, while, in the cylinder 43', there are also a suction port 53' and a discharge port 54' which communicate with the suction passage 47' and the discharge passage 48', respectively, at all operative positions of the piston 49'. A common suction and discharge port 55 is provided in the cylinder 43 for alternate communication with the suction passage 47 and the discharge passage 48, while a common suction and discharge port 55' is provided in the cylinder 43' for alternate communication with the suction passage 47' and the discharge passage 48'. The suction ports 53 and 53' are made to communicate with a common source of liquid supply 56, while the discharge ports 54 and 54' are made to communicate with a common receiver 57. Further, the common suction and discharge ports 55 and 55' in the respective cylinders 43 and 43' are made to communicate with the common suction and discharge ports 41 and 41' in the respective cylinders 33 and 33'. The cam member 51 is arranged for eccentric rotation so as to impart a reciprocating movement to the pistons 49 and 49' in abutment therewith. The electric motor 42 is also drivingly connected with the cam member 51 to drive the cam members 39 and 51 in synchronously interlocked relation to each other.

The embodiment of the invention with the above arrangement operates in the following manner. First referring to FIG. 2, when the electric motor 42 is rotated continuously at a low speed, the piston 37 makes a uniform motion to the left until the cam member 39 completes its half revolution. By the leftward movement of the piston 37, the volume of the chamber 36 successively changes from the maximum to the minimum. Due to the pressure applied to the liquid within the chamber 36 by the piston 37, the liquid within the chamber 36 is delivered into the liquid receiver 57 by way of the common suction and discharge port 41, common suction and discharge port 55, discharge passage 48 and discharge port 54. On the other hand, the piston 37' ceases to move in either direction for a predetermined time as soon as the piston 37 starts to move to the left. Since the cam member 51 is connected with the electric motor 42 to make the synchronously interlocked movement with the cam member 39, the piston 49' of the flow passage changeover means 32 moves to the left by the rotation of the cam member 51 while the piston 37' is held from any movement for the predetermined time so that the common suction and discharge port 55' is made to communicate with the suction passage 47'.

After the predetermined time, the piston 37' held in its inoperative state starts to move to the left, and the volume of the chamber 36' successively changes from the minimum to the maximum. Therefore, negative pressure forms in the chamber 36' and the liquid from the supply source 56 is drawn into the chamber 36' by way of the suction port 53', suction passage 47', common suction and discharge port 55' and common suction and discharge port 41'. After the volume of the chamber 36' has changed from the minimum to the maximum, the piston 37' ceases to move for a predetermined time until the cam member 39 completes its half revolution. While the piston 37' is held from movement for the predetermined time, the piston 49' is urged to the right by the cam member 51 to thereby permit communication between the common suction and discharge port 55' and the discharge passage 48'. During the other half revolution of the cam member 39 from this state to make one complete revolution, the piston 37' makes a uniform movement to the right. By the rightward movement of the piston 37', the volume of the chamber 36' successively changes from the maximum to the minimum. Due to the application of pressure to the liquid within the chamber 36' by the piston 37', the liquid within the chamber 36' is delivered into the receiver 57 by way of the common suction and discharge port 41', common suction and discharge port 55', discharge passage 48' and discharge port 54'.

On the other hand, the piston 37 ceases to move in any direction as soon as the piston 37' starts its rightward movement. While the piston 37 is held from any movement for a predetermined time, the piston 49 moves to the right by the rotation of the cam member 51 to permit communication between the common suction and discharge port 55 and the suction passage 47. After the predetermined time, the piston 37 having been held from the movement starts to move to the right. The rightward movement of the piston 37 causes the successive change in the volume of the chamber 36 from the minimum to the maximum. Therefore, negative pressure forms in the chamber 36 and the liquid is drawn from the supply source 56 into the chamber 36 by way of the suction port 53, suction passage 47, common suction and discharge port 55 and common suction and discharge port 41. After the volume of the chamber 36 has changed from the minimum to the maximum, the piston 37 ceases to move for the predetermined time until the cam member 39 makes one complete revolution. While the piston 37 is held from any movement, the piston 49 is urged to the left by the cam member 51 to permit communication between the common suction and discharge port 55 and the discharge passage 48. Thereafter, the operation entirely same with that described above is repeated to deliver a very small and constant amount of the liquid in a continuous stream without any interruption.

In the apparatus of the invention adapted for the chromatographic analysis of a liquid as shown in FIG. 1, the liquid supply pump with the structure as shown in and explained with reference to FIG. 2 is utilized as the liquid supply pumps 6, 10 and 14. Further, the liquid supply pump with the structure as shown in FIG. 2 is also utilized as the flow restricting means 15 in FIG. 1.

When now the liquid supply pump 6 is driven to draw the eluate from the vessel 1 for flow through the column 4, the sample adsorbed in the head portion of the column 4 is fractionally separated therein due to the fact that various components of the sample have different rates of transference into the eluate. Thus, an affluent appears at the lower end of the column 4. Since the auxiliary conduit 11 is shut off by the action of the pressure means 12, the effluent successively flows towards the reaction vessel 7'. Meanwhile, the liquid supply pump 10 is driven to draw the color-forming liquid from the vessel 3 into the conduit 9. The color-forming liquid joins the effluent for flow into the reaction vessel 7' where they react with each other to form a color. The colored mixture is then made to pass through the flow cell 19 of the flow-through type photometer 8 and measurement is taken during its flow through the flow cell 19. Or more precisely, the light emitted from the lamp 16 is condensed by the condenser lens 17 and monochromatic light is taken out by the filter 18. The monochromatic light transmitted through the flow cell 19 is detected by the detector 20. Signals from the detector 20 are led into the recorder 21 in which values corresponding to absorption coefficients of various components of the sample are continuously recorded. The liquid mixture having passed through the flow cell 19 is passed through the flow restricting means 15 and is wasted.

Suppose now that an amount of the liquid mixture continuously passing through the flow restricting means 15 is 45 milliliters per hour, an amount of the effluent continuously discharged from the lower end of the column 4 is 120 milliliters per hour, and an amount of the color-forming liquid continuously fed by the supply pump 10 is 15 milliliters per hour. Then, by supplying the fraction ratio determining liquid by the supply pump 14 at a rate of 15 milliliters per hour, the amount of the effluent which is made to pass through the reaction vessel 7' and the flow-through type photometer 8 for the purpose of measurement is 15 milliliters out of 120 milliliters of the effluent discharged from the lower end of the column 4, because the amount of flow permitted to flow through the flow restricting means 15 is limited to 45 milliliters per hour. Therefore, the remainder or 105 milliters out of 120 milliliters of the effluent flows to the inlet 23 of the pressure means 12 by way of the auxiliary conduit 11 and urges the resilient member 26 to the right against the compression of the compression spring 27. Then, that portion of the effluent forced into the pressure means 12 flows through the passage 25 and the outlet 24 to be collected within the fraction collector 5. Thus, it will be known that, when the fraction ratio determining liquid is fed in an amount of 15 milliliters per hour, an amount of the effluent supplied for the purpose of analysis is 15 milliliters out of the total amount of 120 milliliters and the remainder or 105 milliliters is collected in the fraction collector 5, which gives a fraction ratio of 1:7. When the fraction ratio determining liquid is likewise supplied by the pump 14 in an amount of 20 milliliters per hour, a fraction ratio of 1:11 can be obtained.

From the foregoing description, it will be understood that the fraction ratio can arbitrarily be established by merely varying the amount of flow of the fraction ratio determining liquid supplied by the supply pump 14. In this case, a liquid such as the eluate or a diluent therefor should be used as the fraction ratio determining liquid since it must not react with any of the sample, eluate and color-forming liquid.

The apparatus of the invention adapted for the chromatographic analysis of liquids is quite advantageous in that various components of a sample successively separated and emerging from the lower end of the column 4 are perfectly prevented from admixing with each other on their way to the photometer since no liquid feeding means such as pumps are not provided in the main conduit 7 between the lower end of the column 4 and the flow-through type photometer 8. The invention is further advantageous in that the fraction ratio can accurately be established by virtue of the unique combination of the pressure means 12 and the flow restricting means 15. Although the liquid supply pump with the structure as shown in FIG. 2 has been used as the flow restricting means 15 in the embodiment described above, any other suitable means may be employed in place thereof so long as it can effectively restrict the flow to a predetermined amount.

In the foregoing description, explanation has been given with regard to the embodiment in which the fraction ratio is established by varying the amount of flow of the fraction ratio determining liquid. However, the prominent effect of the invention can equally effectively be attained by a modification thereof, according to which the vessel 2, the liquid supply pump 14 and the supply conduit 13 for the fraction ratio determining liquid are eliminated and the amount of delivery by the supply pump 10 is solely varied to obtain a desired fraction ratio. In this case, however, the amount of delivery of the color-forming liquid must be varied within a range in which the color is developed in a supersaturated state, because, if the amount of supply of the color-forming liquid is not varied within the range of its supersaturated state, any variation of the amount of supply of the color-forming liquid results in corresponding variation in the intensity of the color formed.

Thus, it will be known that the object of the invention obtained as with the case of the establishment of the fraction ratio by varying the flow amount of the fraction ratio determining liquid can likewise reasonably be attained by establishing the fraction ratio by varying the supply amount of the color-forming liquid within the range in which the color is developed in the supersaturated state.

From the foregoing description, it will be understood that the apparatus according to the invention can quite effectively be used for practical applications due to the prominent features that no admixture of components of the sample separated and emerging from the lower end of the column takes place during their passage through the conduit and the flow-through type photometer, that the ratio of the amount of effluent supplied to the photometer to the amount of the effluent collected in the fraction collector, that is, the fraction ratio can freely be varied, and that the fraction ratio can accurately be established.

What is claimed is:

1. An apparatus for the chromatographic analysis of liquids which comprises a chromatographic column, a liquid supply pump means connected to the upper end of said column for supplying an eluating liquid thereto, a main conduit communicating with the lower end of the said column for conducting an effluent therefrom sequentially to a reaction vessel and a flow-through type photometer, a liquid supply pump for supplying a color-forming liquid through a conduit to the main conduit at a position intermediate the lower end of the chromatography column and the reaction vessel, flow restricting means provided in the main conduit downstream of said flow-through photometer, an auxiliary conduit connected to the main conduit at a position intermediate the lower end of said column and the connection of said color-fomring liquid supply conduit with said main conduit, said main conduit being adapted to conduct a portion of the effluent from the lower end of the chromatography column to the photometer while at the same time conducting the remaining portion of the effluent to the auxiliary conduit, a liquid supply pump for supplying a fraction ratio determining liquid through a conduit to the main conduit at a position intermediate the connection of the color-forming liquid supply conduit with said main conduit and the connection of the auxiliary conduit with said main conduit, a fraction collector means communicating with the auxiliary conduit for collecting said remaining portion of the effluent, adjustable pressure means disposed in the auxiliary conduit for pressurizing the effluent flowing through the auxiliary conduit and to prevent the flow of said effluent into the fraction collector exceeding a predetermined quantity, whereby the fraction ratio of the effluent can be set at any desired value by varying the amount of fraction ratio determining liquid.

2. An apparatus for the chromatographic analysis of liquids which comprises a chromatography column, a liquid supply pump means connected to the upper end of said column for supplying an eluating liquid thereto, a main conduit communicating with the lower end of said column for conducting an effluent therefrom sequentially to a reaction vessel and a flow-through type photometer, a liquid supply pump for supplying a color-forming liquid through a conduit to the main conduit at a position intermediate the lower end of the chromatography column and the reaction vessel, flow restricting means provided in the main conduit downstream of said flow-through photometer, an auxiliary conduit connected to the main conduit at a position intermediate the lower end of said column and the connection of said color-forming liquid supply conduit with said main conduit, said main conduit being adapted to conduct a portion of the effluent from the lower end of the chromatography column to the photometer while at the same time conducting the remaining portion of the effluent to the auxiliary conduit, a fraction collector means communicating with the auxiliary conduit for collecting said remaining portion of the effluent, adjustable pressure means disposed in the auxiliary conduit for pressurizing the effluent flowing through the auxiliary conduit and to prevent the flow of said effluent into the fraction collector means exceeding a predetermined quantity, whereby the fraction ratio of effluent can be set at any desired value by varying the amount of color-forming liquid.

References Cited

UNITED STATES PATENTS

| 2,884,955 | 5/1959 | Yost | 138—31 |
| 3,074,784 | 1/1963 | Ferrari | 23—253 |

MORRIS O. WOLK, *Primary Examiner.*

R. E. SERWIN, *Assistant Examiner.*